United States Patent [19]

Müller et al.

[11] Patent Number: 4,931,117
[45] Date of Patent: Jun. 5, 1990

[54] METHOD FOR MANUFACTURING FRICTIONAL LOCKING RINGS FOR STEPPED MOTOR VEHICLE TRANSMISSION SYNCHRONIZING MECHANISMS

[75] Inventors: Erich R. Müller, Öhringen-Cappel; Günther Schmidt, Neuenstadt; Klaus Hofmeister, Öhringen-Michelbach, all of Fed. Rep. of Germany

[73] Assignee: ZWN Zahnradwerk Neuenstein GmbH & Co., Neuenstein, Fed. Rep. of Germany

[21] Appl. No.: 116,029

[22] Filed: Nov. 3, 1987

[30] Foreign Application Priority Data

Nov. 3, 1986 [DE] Fed. Rep. of Germany ....... 3637386

[51] Int. Cl.[5] .............................................. B32B 18/00
[52] U.S. Cl. ...................................... 156/89; 156/245; 156/293; 156/294; 29/527.4; 192/53 F; 192/107 M
[58] Field of Search ............... 156/89, 293, 294, 245; 427/181, 239, 279, 287; 264/60, 62; 228/120, 122, 903; 29/527.4; 192/53 F, 107 M; 419/5, 8

[56] References Cited

U.S. PATENT DOCUMENTS 2,784,112 3/1957 Nicholson ........................... 427/239
3,248,788 5/1966 Goldstein et al. ................... 156/293
3,445,893 5/1969 Talmage ................................. 18/36
3,547,720 12/1970 Jones ..................................... 264/60
4,314,627 2/1982 Nozawa ......................... 192/107 M
4,618,049 10/1986 Pflaum et al. .................. 192/107 M
4,679,681 7/1987 Creydt et al. ................... 192/107 M
4,762,216 8/1988 Pusatcioglu et al. ........... 192/107 M

FOREIGN PATENT DOCUMENTS 195923 12/1982 Japan .............................. 192/107 M Primary Examiner—Caleb Weston

[57] ABSTRACT

A method for manufacturing a frictional locking member, in particular a synchronizing ring. The surface of a metallic base member (2) is provided with a frictional body made of a sintering powder.

In order to simplify the method, the base member (2) is combined with an insert member (20). The insert member has centering means (24) for retaining the base member (2) in a defined position and at a defined distance (23) from the counter surface (22) arranged at a defined distance (23) from the surface (14). The cavity (27) formed by the defined distance (23) between the surface (14) and the counter surface (22) is filled with a sintering powder, and the insert member (20) is sintered together with the base member (2) with the cavity (27) filled (FIG. 4).

10 Claims, 2 Drawing Sheets

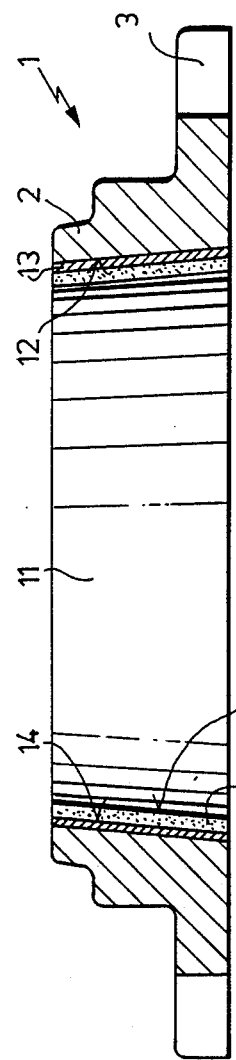
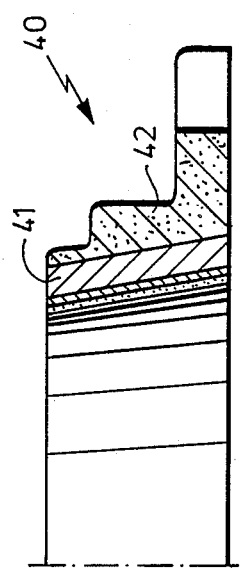
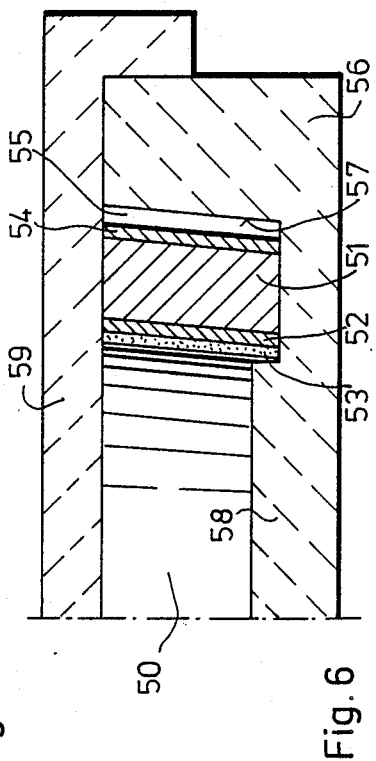
Fig. 1
Fig. 5
Fig. 6

METHOD FOR MANUFACTURING FRICTIONAL LOCKING RINGS FOR STEPPED MOTOR VEHICLE TRANSMISSION SYNCHRONIZING MECHANISMS

The present invention relates to a method for manufacturing frictional locking rings for stepped motor vehicle transmission synchronizing mechanisms, in which the surface of a metallic base member is provided with a frictional body made of a sintering powder.

A method of this type has been known already from German Patent Specification No. 34 17 813.

According to the known method, a granular frictional material capable of being sintered is applied upon a plane carrier plate and sintered together with the latter in an oven. Thereafter, the plane carrier plate is compacted by one or more pressing operations.

Following the sintering and compacting processes, the carrier plate is cut into suitable sections, and the latter are given the desired shape of the frictional body by deep-drawing. This shape may, for example, be a wave-like shape adapting itself to the outer surface of a conical body. The frictional body so formed is then applied to a metallic base member of the frictional locking member, for example a conical bore of a synchronizing ring, and fastened thereon, for example by welding. In the case of the before mentioned wave-like shape, the frictional body may be spot-welded to the base member in the bulged areas adjoining the inner conical surface of the frictional locking ring.

However, the known method is connected with the disadvantage that it requires a number of intermediate steps, namely producing initially the frictional body from the sintering powder and the carrier plate as an intermediate product, shaping the latter and welding it thereafter to the base member, for example the synchronizing ring.

Now, it is the object of the present intention to improve a device and a method of the type described above so that the described procedural steps required according to the prior art are eliminated.

The method mentioned at the outset achieves this object by the steps of combining the base member with an insert member, said insert member having centering means for retaining the base member in a defined position and a counter surface arranged at a defined distance from the said surface, filling the cavity formed by the defined distance between the surface and the counter surface with a sintering powder, and sintering the sintering powder with the insert member and the base member.

This solves the problem underlying the invention fully and perfectly because the frictional body is produced in its definite shape by a single operation during which the frictional body is sintered simultaneously with the corresponding surface of the frictional locking ring. In addition, no separate carrier plate is required, the frictional body being sintered directly upon the base member.

This provides a clearly simplified production process and eliminates the need for a separate carrier plate. In addition, it is an advantage of this method that by sizing the cavity appropriately, it is possible to vary the shapes of the frictional bodies within very wide limits. In particular, the cavity may be designed in such a manner that drainage grooves or other channels for the lubricant can be produced simultaneously by the same operation, by giving the insert member a suitable shape.

According to a preferred embodiment of the invention, the base member is provided initially with an adhesive layer, and the surface is the surface of the adhesive layer. In particular, the adhesive layer can be deposited by spraying a metallic powder using a plasma spray gun.

This feature provides the advantage that the adhesive force between the frictional body and the metallic base member is increased still further so that the frictional locking ring is suited for use also in high-stress applications.

According to another preferred embodiment of the method according to the invention, the cavity is closed, after filling in the sintering powder, by means of a cover which remains attached to the base member and the insert member during sintering.

This feature provides the advantage that the sintering powder is prevented from migrating out of the cavity, which would happen as a result of thermal expansion of the sintering powder if no cover were provided. On the other hand, preventing such migration causes the frictional body to be compacted automatically since the volume of the cavity remains constant. In this manner, the strength of the frictional body is further increased due to the greater density achieved.

According to another embodiment of the method according to the invention using a toroidal element, the base member, after the frictional body has been sintered thereon, is attached by its side not carrying the frictional body to another toroidal member, for example a sintered part, provided with a circumferential toothing.

This feature provides the advantage that a separate part that can be produced easily and which does not have to undergo the sintering process by which the frictional body is applied, can be used in the area of an external or internal toothing.

According to a variant of this method, the base member, after the frictional body has been applied, is provided with the circumferential toothing by a suitable forming method, for example by forging.

This feature provides the advantage that base members of relatively simple shapes can be used as semi-finished products and that the external or internal toothing can be applied subsequently, it being even possible to vary the circumferential toothing for each lot, depending on the envisaged application.

The device according to the invention solves the problem underlying the invention in the case of a conical frictional body by an arrangement in which the insert member comprises a conical section, the surface of the said conical section being spaced from the surface of the base member by a defined distance.

This feature provides the advantage that combining the base member and the insert member is particularly easy since the described shapes produce automatically a hollow conical cavity that can be filled easily with a sintering powder. In addition, the separation of the element carrying the frictional body from the base member after sintering does also not present any problems because the two parts will separate easily due to their conical shape.

Finally, a particularly good effect is obtained when the base member has an inner conically shaped surface and the insert member has an outer conically shaped surface, when the insert member is further made from a material having a low thermal expansion coefficient, preferably from a ceramic material, and when the distance is equal to a predetermined thickness of the frictional body, taking into account the thermal shrinkage of the base member.

This variant makes use of the realization that the final dimension, i.e. the superficial shape of the frictional body finally obtained, can be made reproducible by using a core-like insert member whose geometry remains practically invariable during the manufacturing process—a property which is offered with the accuracy required for the present purposes for example by ceramic materials, within the temperature range between room temperature and, for example, 800° C. The thermal shrinkage occurring as the base member cools down then provides the effect that the frictional body produced from the sintering powder is compacted predominantly by radial forces, i.e. without shearing stresses, so that the final dimension is obtained automatically and in a reproducible manner due to the insert member being invariable in shape.

This provides a very significant advantage over the prior art because the known method and device required the base members to be "grouped", depending on the final dimension presented by the conical opening after the production process which was always connected with certain tolerances. These production tolerances were heretofore compensated by subdividing the base members into certain dimensional ranges and by assigning to them pre-fabricated frictional bodies of different density, together with the associated carrier plate. As compared to this, the features of the invention described above eliminate the need for such "grouping" because the desired final dimension of the surface of the insert member is obtained automatically, independently of the raw dimensions of the conical surface of the base member. Only the thickness of the frictional body varies according to the tolerances of the conical opening of the base member; but this is practically without any importance for the described application.

Other advantages of the invention will be apparent from the following specification and the attached drawing.

It is understood that the features that have been described before and which will be explained hereafter may be used not only in the described combination, but also in any other combination or individually, without leaving the scope of the present invention.

Certain embodiments of the invention will be described hereafter in greater detail with reference to the drawing in which:

FIG. 1 shows a section through one embodiment of a frictional locking ring, i.e. a synchronizing ring with an inner conical friction body and outer toothing;

FIG. 5 shows a representation similar to that of FIG. 1, illustrating a variant of a synchronizing ring produced according to the method of the invention; and FIG. 6 shows a representation similar to that of FIG. 4, illustrating the production of another synchronizing ring with a conical frictional body on its inner and outer surfaces.

Figure 2:
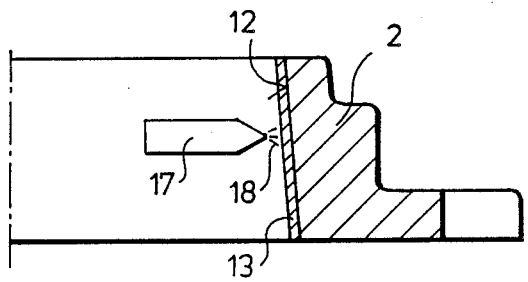
FIG. 2 to 4 show very diagrammatic phase images illustrating the production according to the invention of the synchronizing ring shown in FIG. 1.

The following description of certain embodiments of the invention relates, by way of example, to synchronizing rings as frictional locking rings, although it is understood that the invention can be used similarly for other types of frictional locking members of the type used in particular in motor vehicle transmissions. Further, the described design of the frictional locking ring is of course also not to be understood as limiting the invention; rather, frictional locking elements may also have shapes other than the described conical shape, in particular cylindrical or plane shapes, without leaving the scope of the present invention.

In FIG. 1, reference numeral 1 designates generally a synchronizing ring consisting substantially of a toroidal metallic body 2 with an attached outer toothing 3. The synchronizing ring 1 is pierced by a conical opening 11 which is defined by a first conical inner surface 12 of the metallic body 2. The first inner surface 12 carries an adhesive layer 13 the outside of which defines a second conical inner surface 14. A frictional body 15 applied inwardly of the adhesive layer 13 defines a third, likewise conical inner surface 16. The third inner surface 16 must be produced with very close tolerances as regards the angle of taper and the given diameters.

For producing a synchronizing ring of the type shown in FIG. 1, one may make use, according to the invention, of a method of the type which will be described hereafter with reference to FIGS. 2 to 4.

To begin with, the uncoated metallic body 2, which is available as a semi-finished product, is provided with an adhesive layer 13 on its first inner surface 12. This may be effected, for example, by the plasma spray method using a spray device 17 for spraying a suitable metallic powder 18 upon the first inner surface 12. The powder 18 may consist of a bronze powder, an aluminium/nickel powder, or the like, as known in coating technology.

Although the application of an adhesive layer 13 is convenient for the purposes of the present invention, it is not absolutely necessary.

Figure 3:
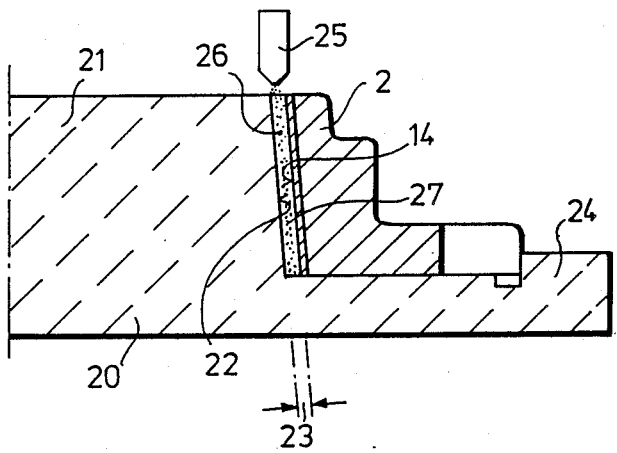

Once the adhesive layer 13 has been applied, the metallic body 2 is fitted to an insert member 20, as shown in FIG. 3. The insert member 20 comprises a central, outer conical section 21 defining by its circumference an outer surface 22. After fitting the metallic body 2, a defined distance 23 is obtained between the outer surface 22 and the second inner surface 14 because the metallic body 2 has been centered in a defined position by means of a centering edge 24 provided on the insert member 20.

Now, a defined quantity of a sintering powder 26 can be filled into the cavity 20 formed by the surfaces 14, 22 and the space 23, using a powder metering unit 25 of the type marketed, for example, by Messrs. Lyman under type No. 55. If necessary, the filling process may be supported by a vibrating movement, or the like, so that finally a packing 28 of the powder 26 is formed in the cavity 27, as shown in FIG. 4.

The sintering powder 26 used may be a mixture of the type described, for example, by the before-mentioned German Patent Specification No. 34 17 813.

Figure 4:
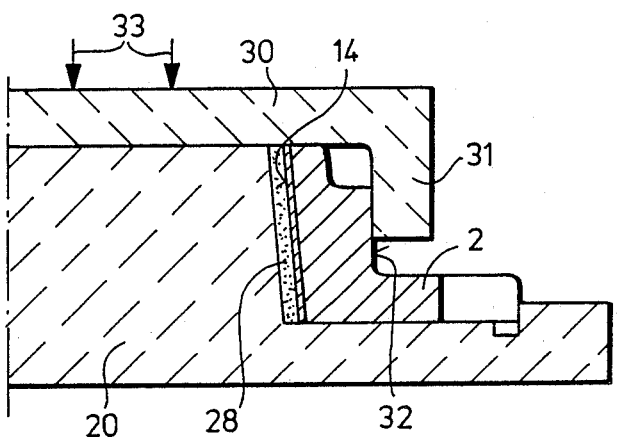

After the sintering powder 26 has been filled in, a cover 30 is fitted on the aligned upper surfaces of the insert member 20 and the metallic body 2, as can be seen in FIG. 4. The circumference of the cover 30 may be provided with an edge 31 embracing a corresponding circumference 32 of the metallic body in a form-locking manner. Finally, the cover 30 may be urged, at a certain pressure, into contact with the insert member 20 and the metallic body 2, as indicated by arrows 33 in FIG. 4.

Now, the compound structure represented in FIG. 4 is sintered as a complete unit, for example at 800° C.

Although the packing 28 of the sintering powder 26 expands during sintering, it cannot migrate out of the cavity 27 as the latter is closed on top by the cover 30. Consequently, the packing 28 and/or the frictional body 15 produced therefrom, is compacted.

A further increase in density results from the fact that the metallic body 2, having a finite temperature coefficient of expansion, shrinks during cooling so that the packing 28 and/or the frictional body produced therefrom is compacted also in the radial direction. Since the angle of taper normally used for the conical surfaces 12, 14, 16, 22 is relatively small, for example only 6.5°, any shrinking of the metallic body over its circumference and, thus, any reduction of its inner diameter will generate substantially radial forces only so that the packing 28 and/or the frictional body 15 produced therefrom is practically not subjected to any shear stresses, i.e. any forces acting in the axial direction.

As indicated by the shaded portions in FIGS. 3 and 4, at least the insert member 20 may consist of a ceramic material. By selecting a suitable ceramic material, the expansion and/or shrinkage of the insert member 20 may be limited to negligible values within the temperature range interesting for the purposes of the invention, i.e. between room temperature and, for example, 800° C. or more. However, this leads to the result that the third inner surface 16 of the frictional body obtained in the final phase of the process is defined by the geometry of the outer surface 22 of the outer conical portion 21 of the insert member 20 which is insofar invariable. Accordingly, the final dimension of the frictional body 15 is independent of any tolerances encountered during production of the metallic body 2 and/or its first inner surface 12, such tolerances influencing only the distance 23 and/or the thickness of the frictional body 13 finally obtained.

On the whole, the method according to FIGS. 2 to 4 therefore produces a synchronizing ring according to FIG. 1, which has a defined final dimension irrespective of any production tolerances of the metallic body 2, while at the same time the frictional body 15 is compacted in two ways, for example by as much as several hundredth of a millimeter, due to the ductile structure of the sintered powder 26.

According to a variant of a synchronizing ring 40, part of which is shown in FIG. 5, an inner metal part 41 having no outer toothing is used. Following the application of a frictional body in the manner described before, the inner metal part 41 may be provided with an outer metal part 42, in particular a sintered part, carrying the desired outer toothing. The outer toothing may differ for different lots of synchronizing rings 40 without such differences influencing in any way the inner metal part 41.

Finally, FIG. 6 shows a variant using a synchronizing ring 50 whose toroidal metallic body 51 is to be provided with frictional bodies on both sides. To this end, an inner adhesive layer 52 is applied on the inside of the metallic body 51, on surfaces which are again of toroidal shape, and an inner frictional body 53 is applied on top thereof, as described before.

In addition, an outer frictional body is to be produced on an outer adhesive layer 54 of outer conical shape, by means of a cavity 55 formed between the metallic body 51 and a matching insert member 56.

To achieve this, the insert body 56 is provided with a corresponding inner conical surface 57, and a centering projection 58 of the insert body 56 retains the metallic body 51 at its center. This arrangement may again be closed by means of a cover 59 after the cavity 55 has been filled with a sintering powder in the manner described before.

We claim:

1. A method for manufacturing frictional locking rings for stepped motor vehicle transmission synchronizing mechanisms, comprising the steps of
   manufacturing a ring-shaped metallic base member provided with a conical locking surface;
   providing said locking surface with a frictional body of hollow conical shape, said frictional body being made of a sintering powder;
   directly sintering said frictional body on said locking surface.

2. The method of claim 1, in which said step of providing said locking surface with said frictional body comprises the further steps of
   combining said base member with an insert member in a concentric relationship, said insert member having a counter surface opposite said locking surface when said base member and said insert member are combined, thus defining a cavity between said locking surface and said counter surface;
   filling in said sintering powder into said cavity;
   sintering said base member and said sintering powder with said insert member combined with said base member.

3. The method of claim 1, in which after manufacturing said base member an adhesive layer is deposited on a surface thereof, thus forming said locking surface on said adhesive layer.

4. The method of claim 3, in which said adhesive layer is deposited on said base member by spraying a metallic powder using a plasma spray gun.

5. The method of claim 2, in which said cavity after filling in said sintering powder is closed by means of a cover, said cover remaining attached to said base member and said insert member during sintering.

6. The method of claim 1, in which said base member is, further, provided with circumferential toothed means.

7. The method of claim 6, in which said base member, after said frictional body has been directly sintered thereon, is attached to a concentric ring member, said ring member being provided with said circumferential toothed means.

8. The method of claim 6, in which said base member, after said frictional body, has been directly sintered thereon, is provided with said circumferential toothed means by forging said toothed means on a periphery of said base member.

9. The method of claim 2, in which said base member has an inner conically shaped locking surface and said insert member has an outer, conically shaped counter surface, said surfaces being arranged in parallel at a predetermined distance to each other, said insert member being made of a material of low thermal expansion coefficient, said distance being equal to a predetermined thickness of said frictional body, taking into account a thermal expansion or shrinking of said base member during sintering.

10. The method of claim 9, in which said insert member is made of a ceramic material.

* * * * *